(12) United States Patent
Fan et al.

(10) Patent No.: US 12,043,133 B2
(45) Date of Patent: Jul. 23, 2024

(54) METHOD FOR SUPPRESSING OVERSHOOTING OF OUTPUT VOLTAGE OR OUTPUT CURRENT, CHARGING DEVICE, AND MEDIUM

(71) Applicant: SHENZHEN WINLINE TECHNOLOGY CO., LTD., Guangdong (CN)

(72) Inventors: Feng Fan, Guangdong (CN); Kaixuan Zhang, Guangdong (CN); Yisai Wu, Guangdong (CN); Chenguang Li, Guangdong (CN); Jiayou Fu, Guangdong (CN); Haidong Zhang, Guangdong (CN); Jianguo Zhu, Guangdong (CN)

(73) Assignee: SHENZHEN WINLINE TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/505,619

(22) Filed: Nov. 9, 2023

(65) Prior Publication Data
US 2024/0075841 A1    Mar. 7, 2024

Related U.S. Application Data

(63) Continuation of application No. PCT/CN2021/140007, filed on Dec. 21, 2021.

(30) Foreign Application Priority Data

Aug. 25, 2021 (CN) .......................... 202110979644.X

(51) Int. Cl.
*B60L 53/62* (2019.01)
*H02J 7/00* (2006.01)

(52) U.S. Cl.
CPC .......... *B60L 53/62* (2019.02); *H02J 7/00304* (2020.01); *H02J 7/00308* (2020.01)

(58) Field of Classification Search
CPC ...................................................... B60L 53/62
(Continued)

(56) References Cited

U.S. PATENT DOCUMENTS 5,850,137 A * 12/1998 Takimoto ................. H02J 7/00
320/140
2006/0139015 A1    6/2006  Dinh
(Continued)

FOREIGN PATENT DOCUMENTS

CN    103455073    * 12/2013
CN    103455073 A    12/2013
(Continued)

OTHER PUBLICATIONS

WIPO International Search Report and Written Opinion with English Translation for International Application No. PCT/CN2021/140007 mailed May 7, 2022.
(Continued)

*Primary Examiner* — Yalkew Fantu
(74) *Attorney, Agent, or Firm* — Young Basile Hanlon & MacFarlane, P.C.

(57) ABSTRACT

Described are a method for suppressing overshoot of an output voltage or output current, a charging device, and a medium. The method for suppressing the overshoot of the output voltage or output current includes the following. A loop in an open-loop state in a closed-loop control circuit is determined. A wave-sending control value output by the closed-loop control circuit at a present beat is obtained. The wave-sending control value output at the present beat is assigned to an open-loop output value at the present beat, where the open-loop output value is an output value of the
(Continued)

loop in the open-loop state. An open-loop output value of a loop in the open-loop state at a next beat is calculated by using an assigned open-loop output value at the present beat.

18 Claims, 7 Drawing Sheets

(58) Field of Classification Search
USPC .......................................................... 320/162
See application file for complete search history.

(56) References Cited

U.S. PATENT DOCUMENTS

| | | |
|---|---|---|
| 2018/0041130 A1 | 2/2018 | Kunz et al. |
| 2019/0190284 A1* | 6/2019 | Pinto .......................... H02J 7/00 |

FOREIGN PATENT DOCUMENTS

| | | | |
|---|---|---|---|
| CN | 105974983 | * | 9/2016 |
| CN | 105974983 A | | 9/2016 |
| CN | 107168443 A | | 9/2017 |
| CN | 107863785 A | | 3/2018 |
| CN | 109687699 A | | 4/2019 |
| CN | 111162583 A | | 5/2020 |
| CN | 111176112 | * | 5/2020 |

OTHER PUBLICATIONS

Chinese First office action with English Translation for CN application No. 202110979644.X dated Oct. 15, 2021.

* cited by examiner

METHOD FOR SUPPRESSING OVERSHOOTING OF OUTPUT VOLTAGE OR OUTPUT CURRENT, CHARGING DEVICE, AND MEDIUM

CROSS-REFERENCE TO RELATED APPLICATION(S)

This application is a continuation of International Application No. PCT/CN2021/140007, filed Dec. 21, 2022, which claims priority to and the benefit of Chinese Patent No. 202110979644X, filed Aug. 25, 2021, the entire disclosures of both of which are hereby incorporated by reference.

TECHNICAL FIELD

This disclosure relates to the field of electric vehicle charging, and in particular, to a method for suppressing overshoot of an output voltage or output current, a charging device, and a medium.

BACKGROUND

With the rapid development of electric vehicle technology, requirements for the safety of an electric vehicle are higher and higher. Especially, while the electric vehicle is charged, the safety of the battery needs to be ensured. Currently, a battery-charging power supply is generally designed to include a voltage loop and a current loop. While the electric vehicle is charged, switching between the voltage loop and the current loop may lead to overshoot of an output voltage or output current of the battery power supply.

SUMMARY

In a first aspect, a method for suppressing overshoot of an output voltage or output current is provided in embodiments of the present disclosure. The method includes the following. A sampling period is determined according to a loop bandwidth. A sampled voltage value or a sampled current value of each loop in a closed-loop control circuit is obtained within the sampling period, where said each loop includes a voltage loop and a current loop, the sampled voltage value is obtained when a loop is the voltage loop, and the sampled current value is obtained when the loop is the current loop. The voltage loop is determined to be in the open-loop state when sampled voltage values are all less than a reference voltage value within a preset time of the sampling period, or the current loop is determined to be in the open-loop state when sampled current values are all less than a reference current value within the preset time of the sampling period. A wave-generation control value output by the closed-loop control circuit at a present beat is obtained. The wave-generation control value output at the present beat is assigned to an open-loop output value at the present beat, where the open-loop output value is an output value of the loop in the open-loop state. An open-loop output value of the loop in the open-loop state at a next beat is calculated by using an assigned open-loop output value at the present beat.

In a second aspect, a charging device is provided in embodiments of the present disclosure. The charging device includes a memory, a processor, and a computer-readable instruction stored in the memory and executable on the processor, the charging device further includes the power supply circuit according to the second aspect, and the computer-readable instruction, when executed by a processor, is operable with the processor to perform operations of the method for suppressing overshoot of an output voltage or output current according to the first aspect.

In a third aspect, a non-transitory computer-readable storage medium is provided in embodiments of the present disclosure. The non-transitory computer-readable storage medium stores a computer-readable instruction, and the computer-readable instruction, when executed by a processor, is operable with the processor to perform operations of the method for suppressing overshoot of an output voltage or output current according to the first aspect.

BRIEF DESCRIPTION OF THE DRAWINGS

In order to describe technical solutions in embodiments of the disclosure more clearly, the following will give a brief introduction to accompanying drawings required for describing embodiments. Apparently, accompanying drawings hereinafter described are merely some embodiments of the disclosure. Based on these drawings, those of ordinary skill in the art can also obtain other drawings without creative effort.

DETAILED DESCRIPTION

Figure 1:
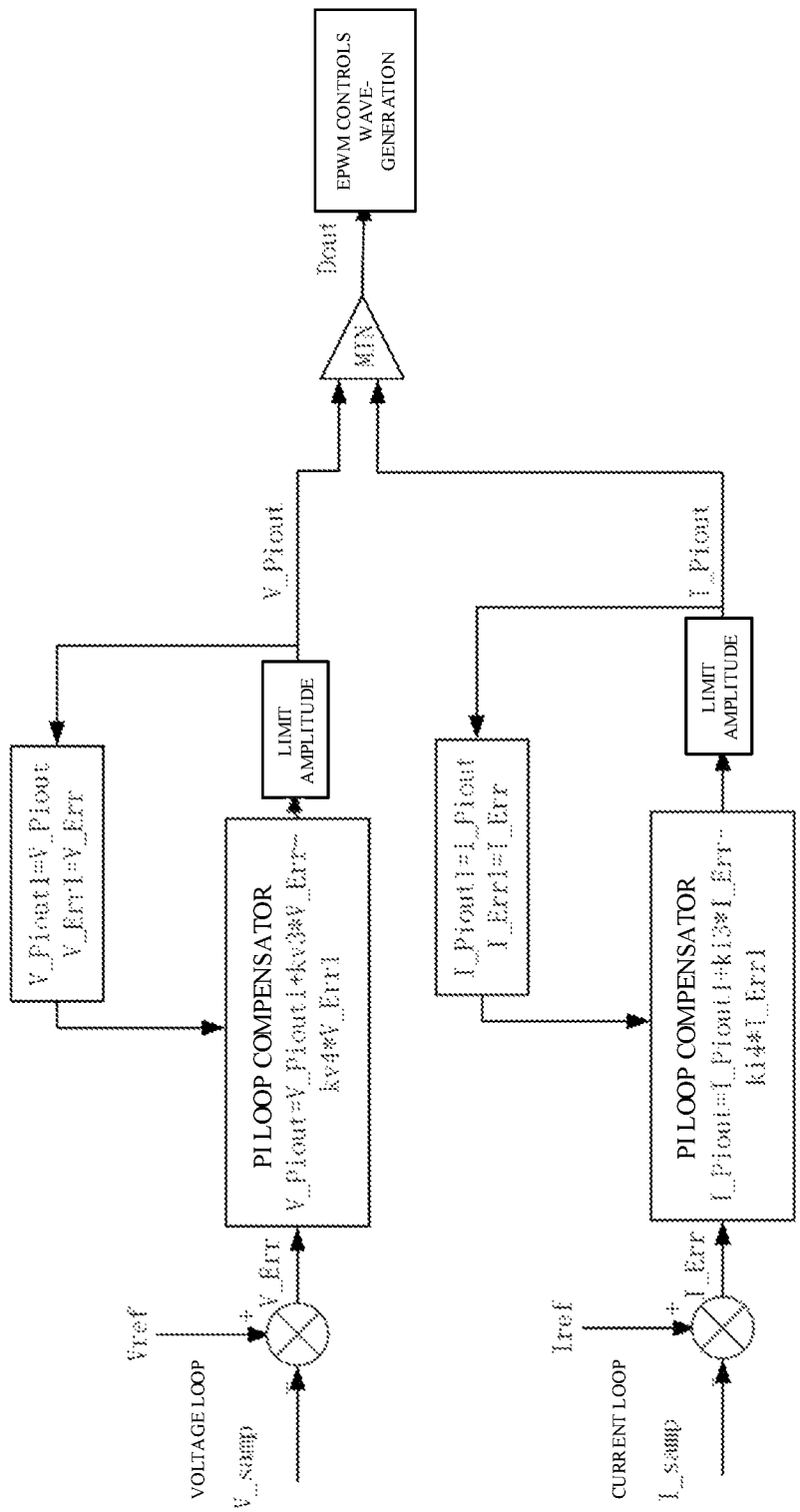
FIG. 1 is a schematic block diagram of a double-loop competitive loop provided in an embodiment of the present disclosure.

In order to better understand the technical solutions of the present disclosure, embodiments of the present disclosure will be described in detail below in conjunction with accompanying drawings.

It may be understood that embodiments described herein are merely some embodiments, rather than all embodiments, of the disclosure. Based on embodiments of the disclosure, all other embodiments obtained by those of ordinary skill in the art without creative effort shall fall within the protection scope of the disclosure.

Terms used herein in the disclosure are for the purpose of describing embodiments only and are not intended to limit the disclosure. As used in embodiments of this disclosure and the appended claims, the singular forms "a" and "the" are intended to include plural forms as well, unless the context clearly indicates otherwise.

It may be understood that, the term "and/or" in this disclosure is simply an illustration of an association relationship of associated objects, indicating that three relationships may exist, for example, A and/or B, which may indicate the existence of A alone, A and B together, and B alone. In addition, the character "/" in this disclosure generally indicates that associated objects are in an "or" relationship.

It may be understood that, although terms such as "first", "second", "third", or the like may be used in embodiments of the present disclosure to describe a preset range or the like, the preset range should not be limited to these terms. These terms are merely used to distinguish preset ranges from each other. For example, within the scope of embodiments of the present disclosure, a first preset range may also be referred to as a second preset range, and similarly, the second preset range may also be referred to as the first preset range.

The term "if" as used herein may be construed as "when", or "while", or "in response to determining", or "in response to detecting", depending on the context. Similarly, the phrase "if it is determined" or "if (a stated condition or event) is detected" may be construed as "when it is determined", or "in response to determining", or "when (a stated condition or event) is detected", or "in response to detecting (a stated condition or event)", depending on the context.

With continuous development and improvement of power supply technologies, output performance indexes and security requirements of a power supply in practical scenarios become higher and higher. Especially in a scenario of charging an electric vehicle, in order to protect security of a battery power supply during charging, overshoot of an output voltage and output current of the battery power supply needs to be suppressed. The overshoot refers to that during a transition from one value to another value, an instantaneous value of any parameter exceeds a final steady-state value of the parameter. In the scenario of charging the electric vehicle, overshoot of the output voltage means that an instantaneous value of the output voltage exceeds a steady-state value (namely, a reference voltage value) of the output voltage, and overshoot of the output current means that an instantaneous value of the output current exceeds a steady-state value (namely, a reference current value) of the output current. When the overshoot of the output voltage or output current occurs, electronic components in the battery power supply may fail or even be damaged, thereby resulting in a series of safety problems.

A closed-loop control is a feedback control where a sampled value of an output value is compared with a desired reference value to generate a deviation signal, and the deviation signal is used to perform a regulation control, so that the output value is as close as possible to the desired reference value. A current closed-loop control circuit generally includes a voltage loop and a current loop. While an electric vehicle is charged, when the voltage loop is in an open-loop state, the current loop is in a closed-loop state; and when the voltage loop is in the closed-loop state, the current loop is in the open-loop state. Especially in some special phases, the voltage loop and the current loop may both be in the open-loop state. It can be understood that, when the voltage loop or the current loop is in the open-loop state, an output voltage of the voltage loop or an output current of the current loop may reach a maximum value because closed-loop compensation calculation not performed. Once the voltage loop is switched to the current loop or the current loop is switched to the voltage loop, the voltage loop or the current loop needs to gradually decrease, through the closed-loop compensation calculation, from the maximum value to the reference voltage value or the reference current value. A connection may be delayed, which may lead to an overshoot peak of the output voltage of the voltage loop or the output current of the current loop in a period when the maximum value gradually decreases to the reference voltage value or the reference current value.

The following takes a double-loop competitive loop as an example to explain a scenario where overshoot of an output voltage or output current may occur when an electric vehicle is charged.

FIG. 1 illustrates a schematic block diagram of a double-loop competitive loop provided in an embodiment of the present disclosure. As illustrated in FIG. 1, the double-loop competitive loop includes a voltage loop and a current loop, where an output voltage is independently controlled by the voltage loop, an output current is independently controlled by the current loop, and a smaller one between an output result of the voltage loop and an output result of the current loop is obtained through a minimum (MIN) operation and taken as an output result Dout. The output result Dout is taken as an actual wave-generation control value to control, for example, an enhanced pulse width modulation (EPWM) duty ratio. In a double-loop competition process, when the battery power supply operates in one of the voltage loop and the current loop, the other one of the voltage loop and the current loop is in an open-loop state.

The voltage loop specifically corresponds to a sampled voltage value V_samp and a reference voltage value Vref. An absolute difference value between the reference voltage value and the sampled voltage value is a difference value V_Err, and the difference value V_Err is an input of a voltage-loop compensator. The voltage-loop compensator may be a proportional-integral (PI) loop compensator. Specifically, a digital transfer function of the PI loop compensator is V_Piout=V_Piout1+kv3*V_Err−kv4*V_Err1, where V_Piout is an amplitude-limited value of an output of the voltage-loop compensator at a present beat, both kv3 and kv4 are loop calculation coefficients (known), and V_Piout1 is an output value of the voltage-loop compensator at a previous beat and is used for loop compensation calculation of the voltage loop at the present beat. It can be understood that, in an assigning stage, V_Piout1=V_Piout, which represents that an output of the voltage loop at the present beat is used as an output of the voltage loop at the previous beat in calculation at a next beat. Similarly, V_Err1=V_Err, which represents that a difference value of the voltage loop at the present beat is used as a difference value of the voltage loop at the previous beat in calculation at the next beat.

The current loop specifically corresponds to a sampled current value I_samp and a reference current value Iref. An absolute difference value between the reference current value and the sampled current value is a difference value I_Err, and the difference value I_Err is an input of a current-loop compensator. The current-loop compensator may be a PI loop compensator. Specifically, a digital transfer function of the PI loop compensator is I_Piout=I_Piout1+ki3*I_Err−ki4*I_Err1, where I_Piout an amplitude-limited value of an output of the current-loop compensator at the present beat, both ki3 and ki4 are the loop calculation coefficient (known), and I_Piout1 is an output value of the current-loop compensator at the previous beat and is used for loop compensation calculation of the current loop at the present beat. It can be understood that, in an assigning stage, I_Piout1=I_Piout, which represents that an output of the current loop at the present beat is used as an output of the current loop at the previous beat in calculation at the next beat. Similarly, I_Err1=I_Err, which represents that a difference value of the current loop at the present beat is used as a difference value of the current loop at the previous beat in calculation at the next beat.

In the double-loop competition process, when a loop is in the open-loop state, a loop calculation result of the loop reaches a maximum value. For example, when the current loop is in the open-loop state, the current loop reaches a saturation maximum output by integration. When a closed-loop control circuit switches from the voltage loop to the current loop, because the output result of the current loop is at a maximum value, the current loop needs to gradually decrease from the maximum value to a desired reference current value. During gradual decreasing, the current will always be in an overshoot state. Especially while the electric vehicle is charged, a slightly higher output voltage of the voltage loop or a slightly higher output current of the current loop may result in a large peak of charging currents, which brings big problems to the safety of electric-vehicle charging.

Figure 2:
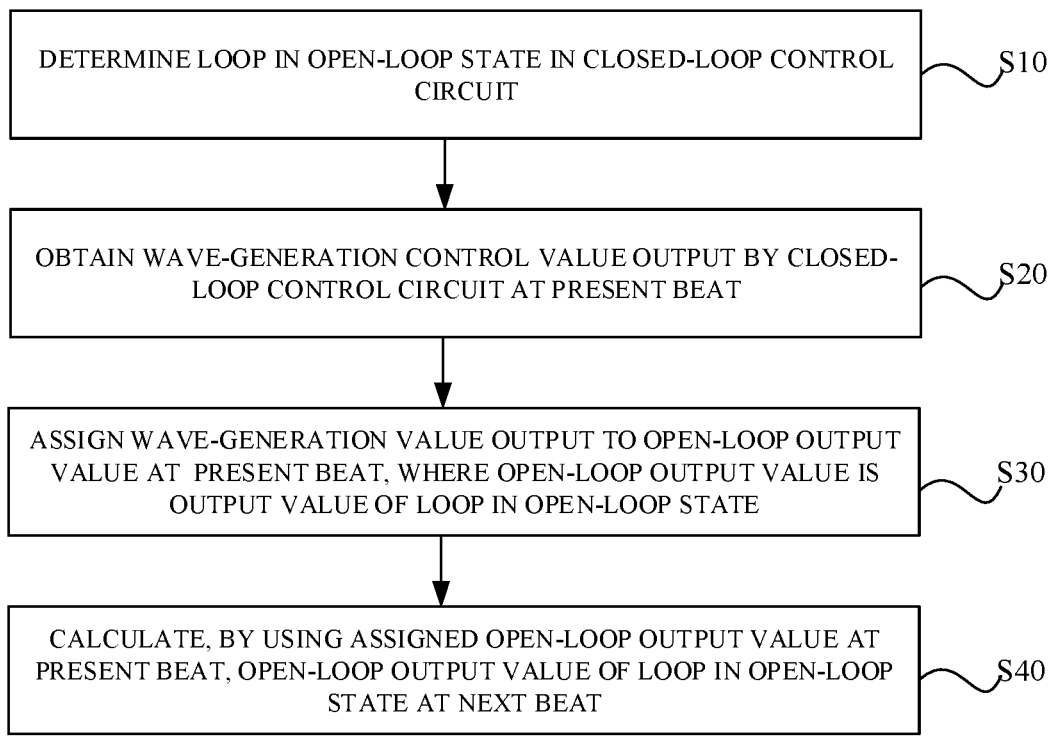
FIG. 2 is a flowchart of a method for suppressing overshoot of an output voltage or output current provided in an embodiment of the present disclosure.

FIG. 2 is a flowchart of a method for suppressing overshoot of an output voltage or output current provided in an embodiment of the present disclosure. The method for suppressing the overshoot of the output voltage or output current can be applicable to electric vehicles, to suppress the overshoot of the output voltage or output current while the electric-vehicle is charged. As illustrated in FIG. 2, the method for suppressing overshoot of the output voltage or output current includes the following.

At S10, a loop in an open-loop state in a closed-loop control circuit is determined.

A closed-loop control circuit is a feedback control circuit. The feedback control circuit compares a sampled value of a circuit output value is compared with the desired reference value to generate a deviation signal, and performs regulation control with the deviation signal, so that the circuit output value is as close as possible to the desired reference value. The reference value may be a reference voltage value or a reference current value. Not all loops in the closed-loop control circuit can be in the closed-loop state. For example, in the closed-loop control circuit having a double-loop competitive loop structure, when the voltage loop is in the closed-loop state, the current loop is in the open-loop state; and when the voltage loop is in the open-loop state, the current loop is in the closed-loop state. It can be understood that, not all loops in the closed-loop control circuit can perform the loop compensation calculation in the closed-loop state.

In an embodiment, since the loop in the open-loop state cannot perform the loop compensation calculation as the loop in the closed-loop state, an output value of the loop in the open-loop state will reach the maximum value. The loop in the open-loop state mainly leads to the overshoot of the output voltage or output current while the electric vehicle is charged. In this embodiment, while the electric vehicle is charged, the loop in the open-loop state in the closed-loop control circuit needs to be determined during charging, so that a loop compensation calculation can be performed for the loop in the open-loop state.

At S20, a wave-generation control value output by the closed-loop control circuit at the present beat is obtained.

In the closed-loop control circuit, a beat refers to an executing process from obtaining a sampled voltage/current value as a voltage/current-loop input to outputting the wave-generation control value. The present beat refers to the executing process performed at present, and the previous beat refers to a previous executing process relative to the present beat.

The wave-generation control value is an output value used to control, for example, the EPWM duty ratio. The wave-generation control value can determine the EPWM duty ratio to output a suitable waveform, so as to precisely control voltages/currents. It can be understood that, the wave-generation control value at the present beat, as an output of the closed-loop control circuit, contains information about a voltage/current output at the present beat. In this embodiment, the information may be used to perform loop compensation calculation on the loop in the open-loop state, so that the loop in the open-loop state can timely receive information about the voltage/current output at the present beat, so as to perform the loop compensation calculation as the loop in the closed-loop. In this way, the loop in the open-loop state can also get feedback as the loop in the closed-loop state.

At S30, the wave-generation control value is assigned to an open-loop output value at the present beat, where the open-loop output value is the output value of the loop in the open-loop state.

It can be understood that the wave-generation control value is the output of the closed-loop control circuit, and when the voltage loop and the current loop both included in the closed-loop control circuit are in the open-loop state, the voltage-loop output and the current-loop output are each the open-loop output value.

In an embodiment, when the closed-loop control circuit is at the present beat, the loop in the open-loop state different from the loop in the closed-loop state and is unable to perform the closed-loop compensation calculation, and an open-loop output value of the loop in the open-loop state reaches the maximum value. For example, a current loop in the open-loop state reaches a saturation maximum output by integration. It can be understood that, when the open-loop output value is at the maximum value all the time, if the closed-loop control circuit switches the loop from the open-loop state to the closed-loop state, an output value at the maximum value takes a certain time to decrease to the desired reference value. During decreasing, the overshoot of the output voltage or output current may occur. In this embodiment, the wave-generation control value is assigned to the open-loop output value at the present beat. In this way, the information about the voltage/current output contained in the wave-generation control value at the present beat can be utilized at each beat, so that the loop in the open-loop state can timely perform the loop compensation calculation as the loop in the closed-loop state, the open-loop output value of the loop in the open-loop state can be updated in time and used in a loop compensator to achieve the purpose of compensation calculation.

At S40, the open-loop output value of the loop in the open-loop state at the next beat is calculated by using an assigned open-loop output value at the present beat.

It can be understood that, if the open-loop output value is at the maximum value, the loop compensation performed by the loop is unable to reach a loop compensation effect. In embodiments of the present disclosure, the assigned open-loop output value at the present beat, that is, the open-loop output value updated according to the wave-generation control value, is taken as one of calculation parameters of an open-loop output value of the loop in the open-loop state at the next beat, which can achieve the loop compensation effect according to an updated open-loop output value at each beat. It can be understood that, since information about the open-loop output value that is not updated lags behind, takeover delay may occur during loop switching. In embodiments of the present disclosure, at each beat, the open-loop output value of the loop in the open-loop state at the next beat is calculated by using the assigned open-loop output value at the present beat, so as to better update the open-loop output value. In this way, when the closed-loop control circuit switches a loop between the open-loop state and the closed-loop state, the takeover delay of the voltage loop or current loop can be avoided, and voltage overshoot in the voltage loop or current overshoot in the current loop can be suppressed.

In embodiments of the present disclosure, firstly, the loop in the open-loop state in the closed-loop control circuit is determined to be subject to loop compensation calculation. Secondly, the wave-generation control value output by the closed-loop control circuit at the present beat is obtained, and the wave-generation control value output at the present beat is assigned to the open-loop output value at the present beat, so that the wave-generation control value output at the present beat can be used to replace the loop compensation effect of a loop in the closed-loop state. Finally, the open-loop output value of the loop in the open-loop state at the next beat is calculated by using the assigned open-loop output value at the present beat, so that the loop in the open-loop state can calculate, according to the assigned open-loop output value at the present beat, the open-loop output value at the next beat, to achieve the loop compensation effect as the loop in the closed-loop state. In this way, the takeover delay of the voltage loop and the current loop of the battery power supply during switching can be reduced, and the overshoot of the voltage loop and current loop during switching can be avoided.

Further, operations at S10, that is, the loop in the open-loop state in the closed-loop control circuit is determined, specifically include the following.

At S11, a sampling period is determined according to a loop bandwidth.

The loop bandwidth refers to a frequency range where the loop can operate steadily. A voltage-loop bandwidth refers to a frequency range where the voltage loop can operate steadily, and a current-loop bandwidth refers to a frequency range where the current loop can operate steadily.

In an embodiment, sampling of output values of the voltage loop or current loop is determined according to the loop bandwidth. The loop bandwidth can reflect whether the loop operates steadily. In this embodiment, the loop bandwidth is used to determine the sampling period where sampling can be performed, so that normal operations such as loop compensation calculation of the loop itself, can be ensured in the sampling period, and output values of the voltage loop or current loop obtained in the sampling period can be determined to be reliable and effective.

At S12, a sampled voltage value or a sampled current value of each loop in the closed-loop control circuit is obtained within the sampling period, where said each loop includes the voltage loop and the current loop, the sampled voltage value is obtained when the loop is the voltage loop, and the sampled current value is obtained when the loop is the current loop.

It can be understood that, a voltage output value is sampled in the voltage loop, and a current output value is sampled in the current loop. Since each loop in the closed-loop control circuit is unknown to be in a closed-loop state or an open-loop state, sampling needs to be performed in the voltage loop and the current loop at the same time, so as to determine the open-loop state or closed-loop state of each loop according to sampled values. The sampled voltage value needs to be obtained when the voltage loop operates steadily in the sampling period, and the sampled current value needs to be obtained when the current loop operates steadily in the sampling period, which can ensure that the obtained sampled voltage value or obtained sampled current value is reliable and valid and will not lead to incorrect judgments on a final judgment result.

At S13, the voltage loop is determined to be in the open-loop state when sampled voltage values are all less than a reference voltage value within a preset time of the sampling period, or the current loop is determined to be in the open-loop state when sampled current values are all less than a reference current value within the preset time of the sampling period.

In an embodiment, for the closed-loop control circuit with a double-loop structure (that is, the voltage loop and the current loop), the loop in the open-loop state has a loop output less than a reference output for a period of time, and the loop in the closed-loop state generally has the loop output higher than the reference output. It can be understood that, integration saturation may occur in the loop in the open-loop state, and therefore the loop takes a long time to reach the reference output. In this embodiment of the present disclosure, the sampled voltage value is compared with a corresponding reference voltage value within the sampling period, or the sampled current value is compared with a corresponding reference current value within the sampling period. In this way, the voltage loop is determined to be in the open-loop state when sampled voltage values are all less than the reference voltage value within the preset time of the sampling period, or the current loop is determined to be in the open-loop state when sampled current values are all less than the reference current value within the preset time of the sampling period.

In operations from S11 to S13, a specific embodiment of determining the loop in the open-loop state in the closed-loop control circuit is provided. Based on integration saturation occurring in the loop in the open-loop state, the sampled voltage value is compared with the corresponding reference voltage value or the sampled current value is compared with the corresponding reference current value within a sampling time. In this way, the loop where sampled voltage values are all less than the reference voltage value within the preset time of the sampling period can be determined to be in the open-loop state, or the loop where sampled current values are all less than the reference current value within the preset time of the sampling period can be determined to be in the open-loop state.

Further, operations at S11, that is, the sampling period is determined according to the loop bandwidth, specifically include the following.

At S111, a time value is selected from $t \geq 1/fg$ as a critical time value, where fg is the loop bandwidth.

The loop bandwidth refers to a frequency range where the loop can operate steadily and can be controlled. In an embodiment, the sampling period t may be selected from $t \geq 1/fg$. In this way, normal loop compensation calculation of the loop in the closed-loop control circuit can be ensured, so that the closed-loop control circuit can steadily operate.

At S112, the sampling period is determined according to the critical time value.

In an embodiment, the selected critical time value may enable the closed-loop control circuit to steadily operate. On the premise of steady operation of the closed-loop control circuit, a sampled voltage output value or sampled current output value has no large error, and data is relatively reliable. After the critical time value is determined, an interval range from time 0 to the critical time value may be taken as the sampling period. The voltage loop is determined to be in the open-loop state when sampled voltage values are all less than the reference voltage value within the preset time of the sampling period, or the current loop is determined to be in the open-loop state when sampled current values are all less than the reference current value within the preset time of the sampling period. It can be understood that, the integration saturation may occur in the loop in the open-loop state, and therefore the loop takes a long time to reach the reference output. While the loop is reaching the reference value, if sampled voltage values are all less than the reference voltage value within a preset time or sampled current values are all less than the reference current value within the preset time, the loop in the open-loop state in the closed-loop control circuit can be determined according to a judgment within the preset time in embodiments of the present disclosure.

In operations from S111 to S112, a specific embodiment of determining the sampling period is provided. The time value may be selected from $t \geq 1/fg$ as the critical time value, and the interval range from time 0 to the critical time value is taken as the sampling period. In this way, normal loop compensation calculation of the loop in the closed-loop control circuit can be ensured, and the closed-loop control circuit can operate steadily. Data of sampled voltage output values or sampled current output values is more reliable, and the voltage loop can be precisely determined to be in the open-loop state when sampled voltage values are all less than the reference voltage value within the preset time of the sampling period, or the current loop can be precisely determined to be in the open-loop state when sampled current values are all less than the reference current value within the preset time of the sampling period.

Further, the wave-generation control value is indicated by a voltage value or a current value.

It can be understood that the closed-loop control circuit includes the current loop and the voltage loop, and an output value of each loop include the voltage value or the current value. The voltage value and the current value can be converted to each other, but output representations are different. When the loop compensation calculation is performed on the loop in the open-loop state or the loop in the closed-loop state, corresponding representation is adopted for the loop compensation calculation according to the actual situation of the loop (for example, the loop is the voltage loop or current loop). In this embodiment, representation of the wave-generation control value is not limited, the wave-generation control value may be indicated in multiple representations, and values of different representations may be mutually converted.

Further, operations at S30, that is, the wave-generation control value is assigned to the open-loop output value at the present beat, specifically include the following.

At S31, the wave-generation control value output at the present beat and indicated by the voltage value is assigned to the open-loop output value at the present beat when the loop in the open-loop state is the voltage loop.

At S32, the wave-generation control value output at the present beat and indicated by the current value is assigned to the open-loop output value at the present beat when the loop in the open-loop state is the current loop.

The closed-loop control circuit includes the voltage loop and the current loop. When the wave-generation control value is assigned to the open-loop output value at the present beat, the wave-generation control value can be assigned in representations of the voltage value or current value according to the actual situation that the loop is the voltage loop or current loop. In this way, the wave-generation control value can be adjusted and converted in advance, so that the assigned open-loop output value at the present beat can maintain the same representation as an original open-loop output value, and the loop compensation calculation can be completed quickly on the loop in the open-loop state.

Further, the open-loop output value is obtained based on the difference value, and the difference value is the absolute difference value between a sampled open-loop value and a reference open-loop value.

It can be understood that, in the closed-loop control circuit, the difference value is used in the loop compensation calculation for the loop in the closed-loop state, but is also used in the loop compensation calculation for the loop in the open-loop state in embodiments of the present disclosure, where the difference value is the absolute difference value between the sampled open-loop value and the reference open-loop value.

It can be understood that, the loop compensation calculation can also be performed on the loop in the open-loop state in the present disclosure. The wave-generation control value is assigned to the open-loop output value at the present beat, the sampled open-loop value is also affected, and correspondingly, the difference value obtained based on the sampled open-loop value is updated with the beat. In this way, when the loop compensation calculation is performed by using the wave-generation control value on the loop in the open-loop state, accuracy of parameters in the loop compensation calculation can be ensured.

Further, the open-loop output value is calculated by the PI loop compensator for loop compensation and obtained from an original open-loop output value limited in amplitude, and the original open-loop output value satisfies: $Piout = Piout1 + k3*Err - k4*Err1$, where Piout1 is an open-loop output value at the previous beat, k3 is a first loop-calculation-coefficient, k4 is a second loop-calculation-coefficient, Err is the difference value, and Err1 is a difference value at the previous beat.

Further, the loop compensator may also be other types of compensators, which are not limited herein.

K3 and k4 are known parameters and are related to a selected compensator. K3 and k4 can be indicated as kv3 and kv4 in the loop compensation calculation for the voltage loop, and can be indicated as ki3 and ki4 in the loop compensation calculation for the current loop. It can be understood that, calculation of the original open-loop output value involves the open-loop output value at the previous beat, the difference value at the present beat, and the difference value at the previous beat. After the amplitude is limited, an output value of the loop gets closer to the reference open-loop value as possible. In embodiments of the present disclosure, the loop compensation calculation can be effectively performed by using the PI loop compensator, so that the open-loop output value is closer to the reference open-loop value after the loop compensation calculation is completed.

Further, the closed-loop control circuit not only includes the double-loop competitive loop, but also may include a nested loop or the like.

Figure 3:
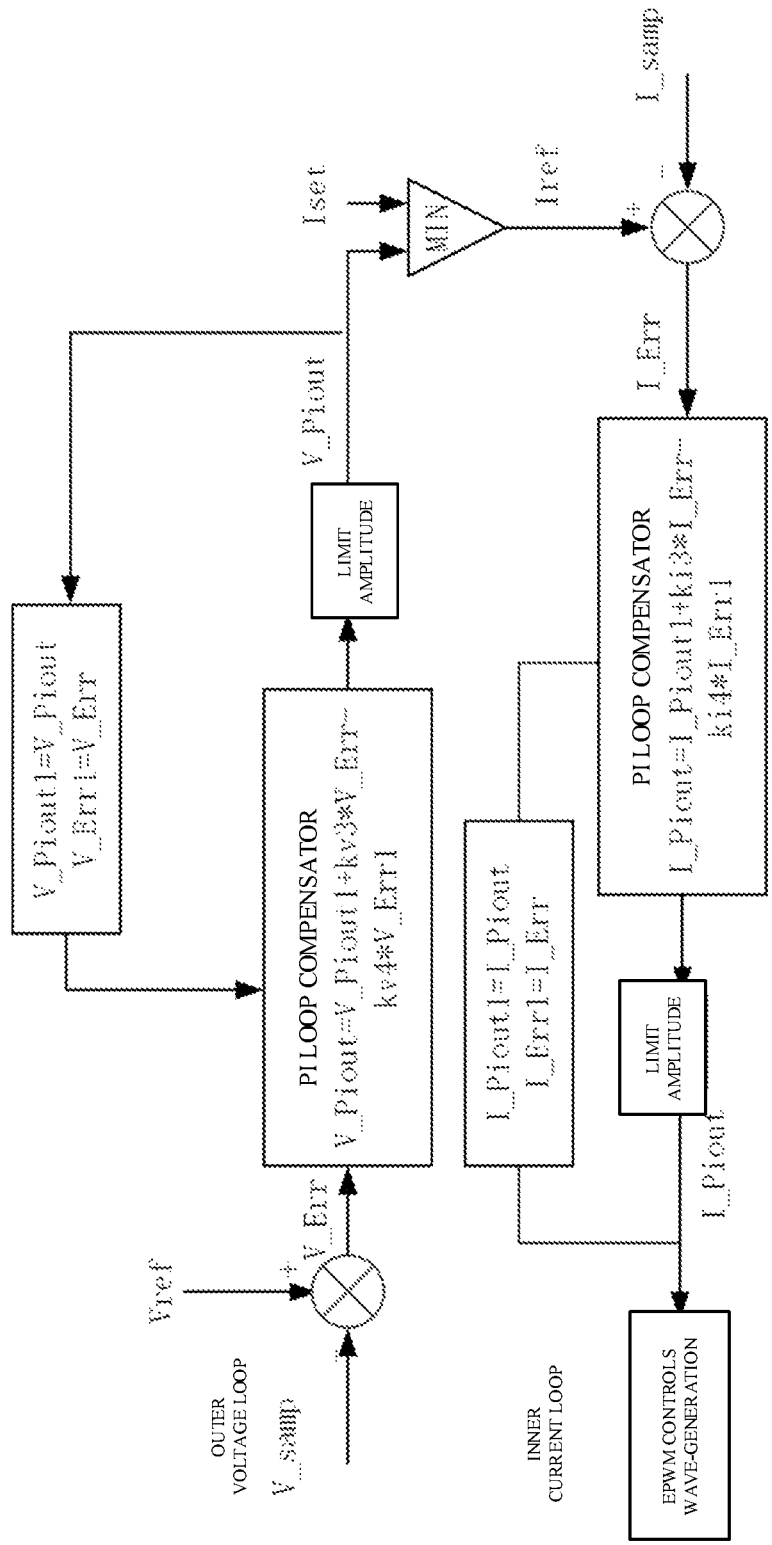
FIG. 3 is a schematic block diagram of a nested loop provided in an embodiment of the present disclosure.

FIG. 3 is a schematic block diagram of a nested loop provided in an embodiment of the present disclosure. As illustrated in FIG. 3, the nested loop includes an outer voltage loop and an inner current loop. A smaller one between an output voltage of the outer voltage loop and a set current value (Iset) of the inner current loop is obtained through the MIN operation, and is taken as a reference current value (Iref) of the inner current loop to control an actual output current value. The actual output current value is taken as an actual wave-generation control value to control, for example, the EPWM duty ratio. While the electric vehicle is charged, if the battery power supply operates in the inner current loop (and the inner current loop is in the close-loop state), the outer voltage loop is in the open-loop state, and the outer voltage loop is at a saturated output. In this case, once the battery power supply exits from the inner current loop, for example, off-loading or switching from heavy load to light load, an output voltage value of the outer voltage loop needs to be gradually reduced from the maximum value to a present reference voltage value. Takeover delay of the outer voltage loop may lead to a large overshoot peak of the output voltage in this period.

The outer voltage loop specifically corresponds to the sampled voltage value V_samp, the reference voltage value Vref. The absolute difference value between the reference voltage value and the sampled voltage value is the difference value V_Err, and the difference value V_Err is an input of an outer-voltage-loop compensator. The compensator may be the PI loop compensator. Specifically, a digital transfer function of the PI loop compensator is V_Piout=V_Piout1+kv3*V_Err−kv4*V_Err1, where V_Piout is an amplitude-limited value of an output of the outer-voltage-loop compensator at a present beat, both kv3 and kv4 are loop calculation coefficients (known), and V_Piout1 is an output value of the outer-voltage-loop compensator at the previous beat and is used for loop compensation calculation of the outer voltage loop at the present beat. It can be understood that, in the assigning stage, V_Piout1=V_Piout, which represents that the output of the outer voltage loop at the present beat is used as an output of the outer voltage loop at the previous beat in calculation at the next beat. Similarly, V_Err1=V_Err, which represents that a difference value of the outer voltage loop at the present beat is used as a difference value of the outer voltage loop at the previous beat in calculation at the next beat.

The inner current loop specifically corresponds to the sampled current value I_samp and the reference current value Iref. The absolute difference value between the reference current value and the sampled current value is the difference value I_Err, and the difference value I_Err is an input of an inner-current-loop compensator. The compensator may be the PI loop compensator. Specifically, a digital transfer function of the PI loop compensator is I_Piout=I_Piout1+ki3*I_Err−ki4*I_Err1, where I_Piout an amplitude-limited value of an output of the inner-current-loop compensator at the present beat, both ki3 and ki4 are loop calculation coefficients (known), and I_Piout1 is an output value of an inner-current-loop compensator at the previous beat and is used for loop compensation calculation of the inner current loop at the present beat. It can be understood that, in an assigning stage, I_Piout1=I_Piout, which represents that an output of the inner current loop at the present beat is used as an output of the inner current loop at the previous beat in calculation at the next beat. Similarly, I_Err1=I_Err, which represents that a difference value of the inner current loop at the present beat is used as a difference value of the inner current loop at the previous beat in calculation at the next beat. It can be seen that, for the closed-loop control circuit including the outer voltage loop and the inner current loop, no matter whether the double-loop competitive structure or the nested structure is used, overshoot of the output voltage or output current of the battery power supply occurs.

Taking two closed-loop control circuits (that is, the double-loop competitive loop and the nested loop) as examples, the present disclosure provides specific embodiments for suppressing overshoot of the output voltage or output current of the battery power supply in the double-loop competitive loop and the nested loop respectively.

Figure 4:
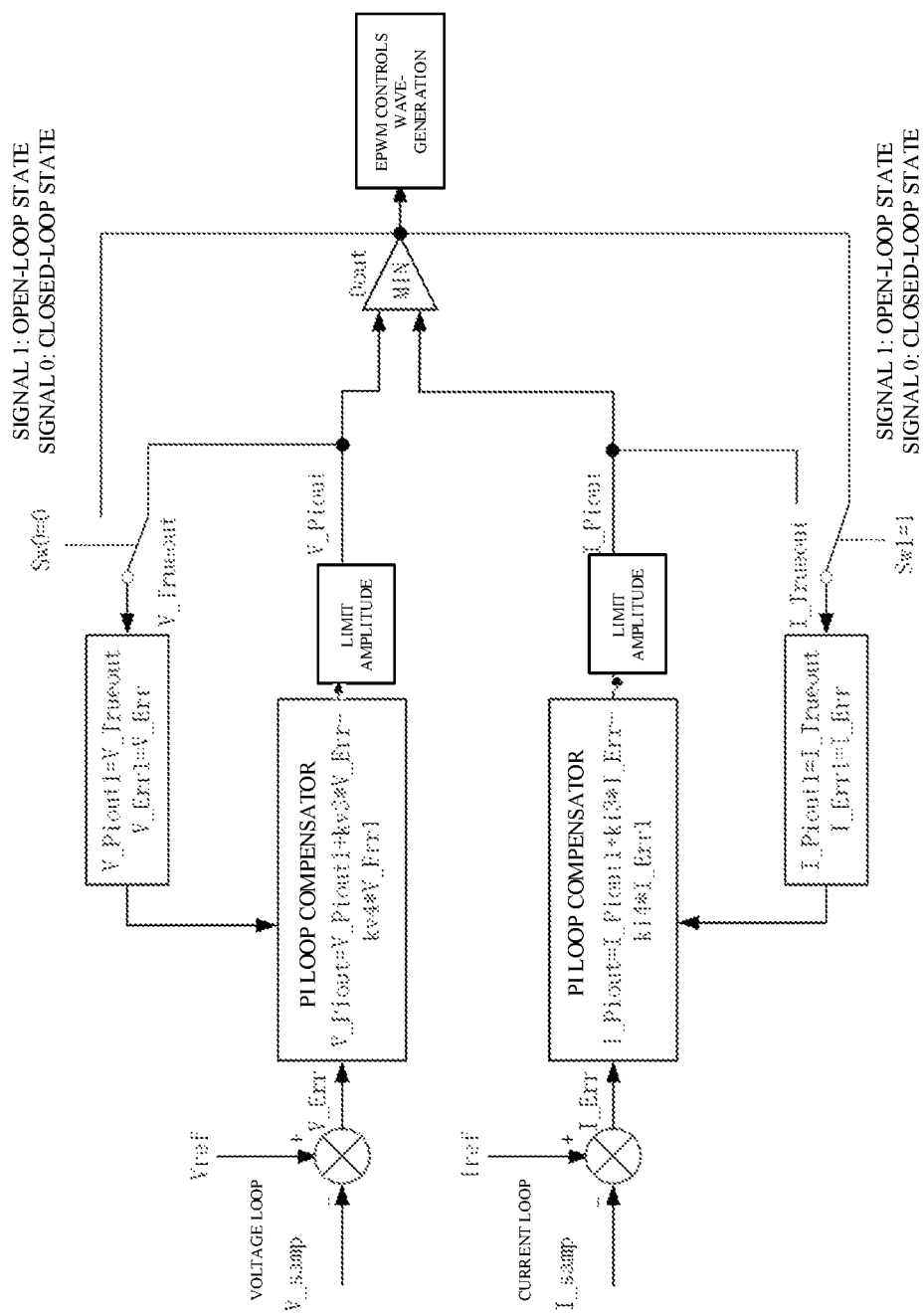
FIG. 4 is a schematic block diagram of an improved double-loop competitive loop provided in an embodiment of the present disclosure.

FIG. 4 is a schematic block diagram of an improved double-loop competitive loop provided in an embodiment of the present disclosure.

Compared with FIG. 1, a switch Sw0 is additionally arranged in the voltage loop and a switch Sw1 is additionally arranged in the current loop in FIG. 4. Each switch has two signal states, that is, a signal 1 and a signal 0. The signal 1 indicates that the loop is in the open-loop state at present, and the signal 0 indicates that the loop is in the closed-loop state at present.

When the voltage loop is in the open-loop state, the switch Sw0 is 1. In this case, the output result Dout is assigned to V_Piout1 and used for calculation of the voltage loop at the next beat. It may be noted that, the output result Dout being assigned to V_Piout1 and used for the calculation of the voltage loop at the next beat is a result-based expression. In fact, the output result Dout is assigned to V_Piout; when the calculation of the voltage loop at the next beat is performed, V_Piout is assigned to V_Piout1 as V_TrueOut, in other words, a value of V_Piout1, which is finally used for calculation, is equal to a value of the output result Dout. When the loop is in the open-loop state, V_TrueOut represents a value obtained by assigning the output result Dout to V_Piout, that is, an actual output of the voltage loop. When the calculation of the voltage loop at the next beat is performed, V_Piout1=V_TrueOut, which represents that V_Piout1 is assigned by V_TrueOut.

When the voltage loop is in the closed-loop state, the switch Sw0 is 0. In this case, V_Piout is assigned by the voltage loop to V_Piout1 (when the loop is in the closed-loop state, V_TrueOut=V_Piout, and V_Piout1=V_TrueOut), and is used for the calculation of the voltage loop at the next beat. It may be noted that V_TrueOut may be only a concept (mainly used for distinguishing from the actual output of the voltage loop) and is not necessarily used for actual assignment calculation. The solutions of the present disclosure may also be implemented only by assignment calculation of Dout, V_Piout, and V_Piout1.

The concept of V_Piout and the concept of V_Piout1 are relative. When V_Piout is used for the calculation of the voltage loop at the next beat, V_Piout becomes V_Piout1. V_Piout1 is referenced to V_Piout, and V_Piout1 is determined by V_Piout.

Similarly, when the current loop is in the open-loop state, the switch Sw1 is 1. In this case, the output result Dout is assigned to I_Piout1 and used for calculation of the current loop at the next beat. When the current loop is in the closed-loop state, the switch Sw1 is 0. In this case, I_Piout is assigned by the current loop to the I_Piout1 and used for the calculation of the current loop at the next beat.

It can be understood that, in the improved double-loop competitive loop, the wave-generation control value is assigned to the calculation of the loop in the open-loop state, and a wave-generation control value Dout is involved in the open-loop calculation as an output result at the previous beat. In this case, the output value of the voltage loop or current loop can be avoided from being at the maximum value caused by the voltage loop or current loop being in the open-loop state for a long time, the takeover delay of the voltage loop or current loop is avoided, and voltage overshoot generated by the voltage loop or current overshoot generated by the current loop can be effectively suppressed.

Figure 5:
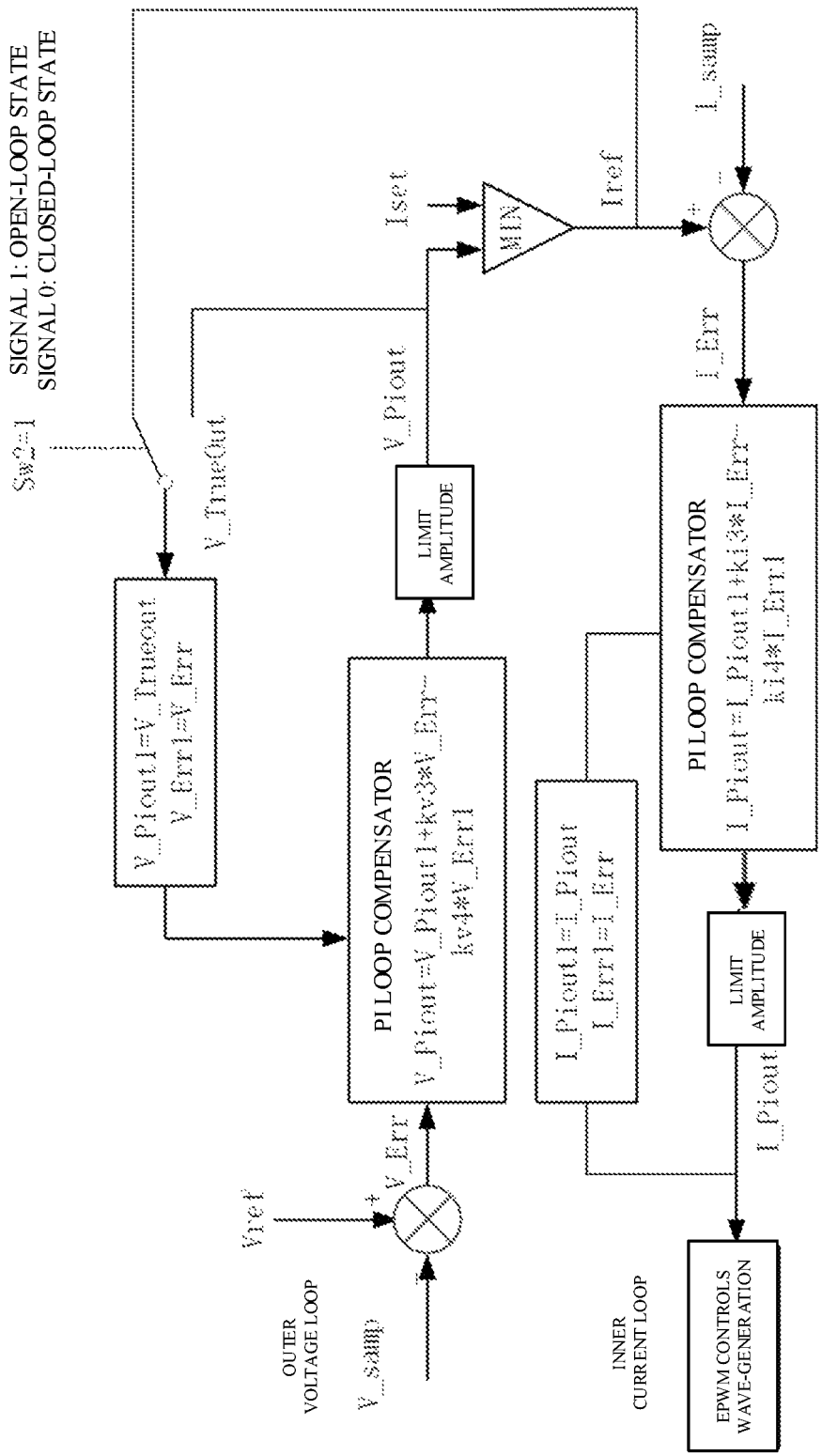
FIG. 5 is a schematic block diagram of an improved nested loop provided in an embodiment of the present disclosure.

FIG. 5 a schematic block diagram of an improved nested loop provided in an embodiment of the present disclosure.

As illustrated in FIG. 5, the improved nested loop includes an outer voltage loop and an inner current loop.

The nested loop includes the outer voltage loop and the inner current loop. The smaller one between the output voltage of the outer voltage loop and the set current value Iset of the inner current loop is obtained by using the MIN operation, and is taken as the reference current value Iref of the inner current loop to control the actual current output value. The actual current output value is taken as the actual wave-generation control value to control, for example, the EPWM duty ratio.

Compared with FIG. 2, a switch Sw2 is additionally arranged to the outer voltage loop in FIG. 5. The switch Sw2 includes two signal states, that is, the signal 1 and the signal 0. The signal 1 indicates that the outer voltage loop is in the open-loop state at present, and the signal 0 indicates that the outer voltage loop is in the closed-loop state at present.

When the outer voltage loop is in the open-loop state, the switch Sw2 is 1. In this case, the reference current value Iref is converted to a voltage value, and the converted voltage value is assigned to V_Piout1 of the outer voltage loop and used for calculation of the outer voltage loop at the next beat. The assigning process may specifically include the following. The reference current value Iref is converted to the voltage value, and the converted voltage value is assigned to V_Piout. When the calculation of the outer voltage loop at the next beat is performed, V_Piout is assigned, via V_TrueOut, to V_Piout1, in other words, the value of V_Piout1, which is finally used for calculation, is equal to the voltage value converted from the reference current value Iref. When the loop is in the open-loop state, V_TrueOut represents a value obtained by assigning the voltage value converted from the Iref to V_Piout, that is, an actual output of the outer voltage loop. When the calculation of the outer voltage loop at the next beat is performed, V_Piout1=V_TrueOut, which represents that V_Piout1 is assigned by V_TrueOut. When the outer voltage loop is in the closed-loop state, the switch Sw2 is 0. In this case, V_Piout is assigned by the outer voltage loop to V_Piout1 and is used for the calculation of the outer voltage loop at the next beat.

It can be understood that, in the improved nested loop, the voltage value converted from the reference current value Iref is assigned to the calculation of the loop in the open-loop state, and the voltage value converted from the reference current value Iref is involved in calculation of the voltage loop in the open-loop state as the output result at the previous beat. In this case, the output value of the voltage loop or current loop can be avoided from being at the maximum value caused by the voltage loop or current loop being in the open-loop state for a long time, the takeover delay of the voltage loop or current loop is avoided, and voltage overshoot generated by the voltage loop or current overshoot generated by the current loop can be effectively suppressed.

Figure 6:
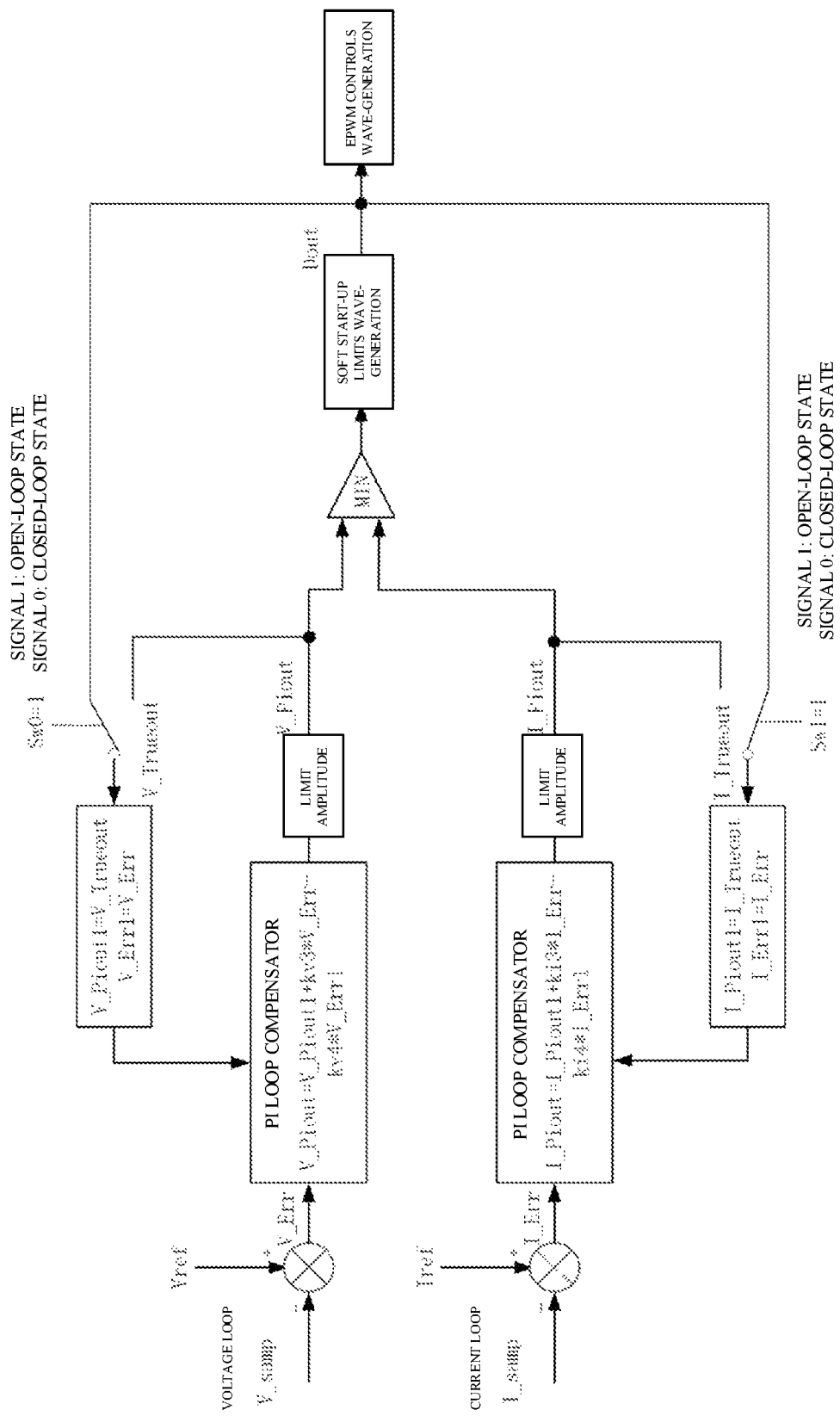
FIG. 6 is a schematic block diagram illustrating both a voltage loop and a current loop in an open-loop state during soft start-up provided in an embodiment of the present disclosure.

FIG. 6 is a schematic block diagram illustrating both a voltage loop and a current loop in an open-loop state during soft start-up provided in an embodiment of the present disclosure. As illustrated in FIG. 6, compared with FIG. 4, the voltage loop and the current loop are both in the open-loop state, that is, Sw0=1 and Sw1=1. In addition, a step of soft start-up to limit the wave-generation is also included after the MIN operation. It can be understood that, in actual application, especially while the electric vehicle is charged, the battery power supply may have a soft start-up strategy. The soft start-up strategy can control a wave-generation value to open step by step according to a certain stepping. Both the voltage loop and the current loop may be in the open-loop state while the wave-generation is opening to a loop takeover. In embodiments of the present disclosure, the switch Sw0 and the switch Sw1 are additionally arranged. When both the voltage loop and the current loop are in the open-loop state, the output result Dout of the closed-loop control circuit is assigned to the loop output of the voltage loop and the current loop at the present beat and is used for the loop compensation calculation of the voltage loop and current loop at the next beat, so that the takeover delay of the voltage loop or current loop can be avoided, and the voltage overshoot generated by the voltage loop during soft start-up or the current overshoot generated by the current loop during soft start-up can be effectively avoided.

In embodiments of the present disclosure, firstly, the loop in the open-loop state in the closed-loop control circuit is determined to be subject to the loop compensation calculation. Secondly, the wave-generation control value output by the closed-loop control circuit at the present beat is obtained, and the wave-generation control value output at the present beat is assigned to the open-loop output value at the present beat, so that the wave-generation control value output at the present beat can be used to replace the loop compensation effect of a loop in the closed-loop state. Finally, the open-loop output value of the loop in the open-loop state at the next beat is calculated by using the assigned open-loop output value at the present beat, so that the loop in the open-loop state can calculate, according to the assigned open-loop output value at the present beat, the open-loop output value at the next beat, to achieve the loop compensation effect as the loop in the closed-loop state. In this way, the takeover delay of the voltage loop and the current loop of the battery power supply during switching can be reduced, and the overshoot of the voltage loop and current loop during switching can be avoided.

Further, in embodiments of the present disclosure, integral saturation may occur in the loop in the open-loop state, the sampled voltage value is compared with the corresponding reference voltage value within the sampling period, or the sampled current value is compared with the corresponding reference current value within the sampling period. In this way, the voltage loop can be determined to be in the open-loop state when sampled voltage values are all less than the reference voltage value within the preset time of the sampling period, or the current loop is determined to be in the open-loop state when sampled current values are all less than the reference current value within the preset time of the sampling period.

Further, in embodiments of the present disclosure, the time value may be selected from t≥1/fg as the critical time value, and the interval range from time 0 to the critical time value is taken as the sampling period. In this way, normal loop compensation calculation of the loop in the closed-loop control circuit can be ensured, and the closed-loop control circuit can operate steadily. The data of sampled voltage output values or sampled current output values is more reliable, and the voltage loop can be precisely determined to be in the open-loop state when sampled voltage values are all less than the reference voltage value within the preset time of the sampling period, or the current loop can be precisely determined to be in the open-loop state when sampled current values are all less than the reference current value within the preset time of the sampling period.

Further, when the wave-generation control value is assigned to the open-loop output value at the present beat, the wave-generation control value can be assigned in representations of the voltage value or current value according to the actual situation that the loop is the voltage loop or current loop. In this way, the wave-generation control value can be adjusted and converted in advance, so that the assigned open-loop output value at the present beat can maintain the same representation as the original open-loop output value, and the loop compensation calculation can be completed on the loop in the open-loop state quickly.

Further, the wave-generation control value is assigned to the open-loop output value at the present beat, the sampled open-loop value is also affected, and correspondingly, the difference value obtained based on the sampled open-loop value is updated with the beat. In this way, when the loop compensation calculation is performed on the loop in the open-loop state by using the wave-generation control value, the accuracy of parameters in the loop compensation calculation can be ensured.

Further, the loop compensation calculation can be effectively performed by using the PI loop compensator, so that the open-loop output value is closer to the reference open-loop value after the loop compensation calculation is completed.

It may be understood that, in various embodiments described herein, the magnitude of a sequence number of each process does not mean an order of execution, and the order of execution of each process should be determined by its function and internal logic and shall not constitute any limitation to an embodiment process of embodiments.

A power supply circuit is further provided in embodiments of the present disclosure. The power supply circuit is a closed-loop control circuit and includes a voltage loop, a current loop, and a wave-generation controlling module. The voltage loop is configured to control an output voltage value. The current loop is configured to control an output current value. One of the voltage loop and the current loop is in an open-loop state, and the other of the voltage loop and the current loop is in a closed-loop state when the power supply circuit is electrified, or both the voltage loop and the current loop are in the open-loop state when the power supply circuit is electrified. A wave-generation controlling module is configured to control wave-generation by a wave-generation control value output by the power supply circuit. Each of the voltage loop and the current loop includes a loop compensator, an amplitude limiting module, an assigning module, and a switch. The loop compensator is configured to perform closed-loop compensation calculation. The amplitude limiting module is configured to limit an amplitude of an output value of the loop compensator to obtain an open-loop output value or a closed-loop output value. The assigning module is configured to use an output value of a loop in the closed-loop state at a present beat in loop compensation calculation of the loop in the closed-loop state at a next beat, or assign a wave-generation control value output by the closed-loop control circuit at the present beat to the open-loop output value, and calculate, by using an assigned open-loop output value at the present beat, an open-loop output value of the loop in the open-loop state at the next beat, where the open-loop output value is an output value of the loop in the open-loop state. The switch is configured to switch between the open-loop state and the closed-loop state of the voltage loop and the current loop.

Figure 7:
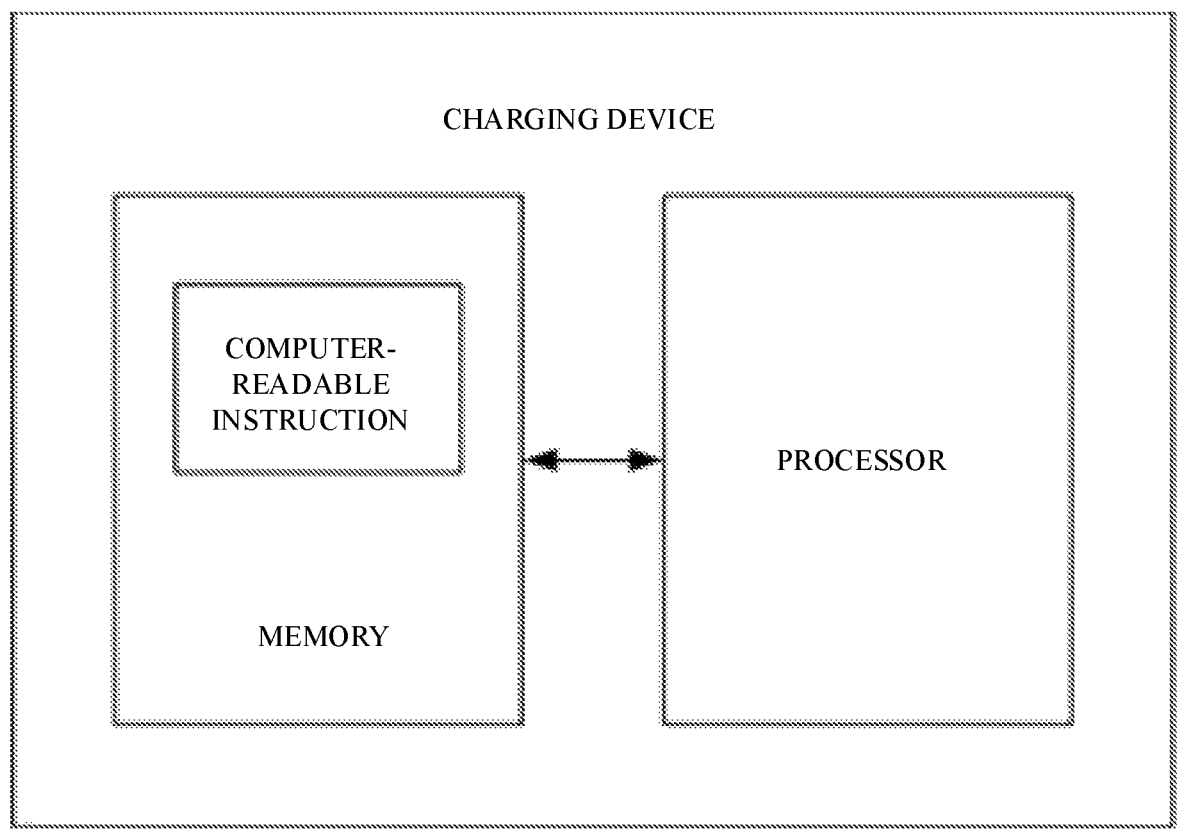
FIG. 7 is a schematic block diagram of a charging device provided in an embodiment of the present disclosure.

FIG. 7 is a schematic block diagram of a charging device provided in an embodiment of the present disclosure. As illustrated in FIG. 7, a charging device is further provided in embodiments of the present disclosure. The charging device includes a memory, a processor, and a computer-readable instruction stored in the memory and executable on the processor. The charging device further includes the power supply circuit described in the above embodiments. The power supply circuit is arranged in a charging module of the charging device. The computer-readable instruction, when executed by the processor, is operable with the processor to perform the following operations. The loop in the open-loop state in the closed-loop control circuit is determined. A wave-generation control value output by the closed-loop control circuit at the present beat is obtained. The wave-generation control value output at the present beat is assigned to an open-loop output value at the present beat, where the open-loop output value is the output value of the loop in the open-loop state. The open-loop output value of the loop in the open-loop state at the next beat is calculated by using an assigned open-loop output value at the present beat.

Further, the computer-readable instruction, when executed by the processor, is operable with the processor to further perform the following operations. A sampling period is determined according to a loop bandwidth. A sampled voltage value or a sampled current value of each loop in the closed-loop control circuit is obtained within the sampling period, where said each loop includes the voltage loop and the current loop, the sampled voltage value is obtained when the loop is the voltage loop, and the sampled current value is obtained when the loop is the current loop. The voltage loop is determined to be in the open-loop state when sampled voltage values are all less than a reference voltage value within a preset time of the sampling period, or the current loop is determined to be in the open-loop state when sampled current values are all less than a reference current value within the preset time of the sampling period.

Further, the computer-readable instruction, when executed by the processor, is operable with the processor to further perform the following operations. A time value is selected from $t \geq 1/fg$ as a critical time value, where fg is the loop bandwidth, and the sampling period is determined according to the critical time value.

Further, the wave-generation control value is indicated by a voltage value or a current value.

Further, the computer-readable instruction, when executed by the processor, is operable with the processor to further perform the following operations. The wave-generation control value output at the present beat and indicated by the voltage value is assigned to the open-loop output value at the present beat when the loop in the open-loop state is the voltage loop. The wave-generation control value output at the present beat and indicated by the current value is assigned to the open-loop output value at the present beat when the loop in the open-loop state is the current loop.

Further, the open-loop output value is obtained based on a difference value, and the difference value is an absolute difference value between a sampled open-loop value and a reference open-loop value.

Further, the open-loop output value is calculated by a proportional-integral (PI) loop compensator for loop compensation and obtained from an original open-loop output value limited in amplitude, and the original open-loop output value satisfies: Piout=Piout1+k3*Err−k4*Err1, where Piout1 is an open-loop output value at a previous beat, k3 is a first loop-calculation-coefficient, k4 is a second loop-calculation-coefficient, Err is the difference value, and Err1 is a difference value at the previous beat.

Further, the closed-loop control circuit includes a double-loop competitive loop and a nested loop.

In embodiments of the present disclosure, firstly, the loop in the open-loop state in the closed-loop control circuit is determined to be subject to loop compensation calculation. Secondly, the wave-generation control value output by the closed-loop control circuit at the present beat is obtained, and the wave-generation control value output at the present beat is assigned to the open-loop output value at the present beat, so that the wave-generation control value output at the present beat can be used to replace a loop compensation effect of a loop in the closed-loop state. Finally, the open-loop output value of the loop in the open-loop state at the next beat is calculated by using the assigned open-loop output value at the present beat, so that the loop in the open-loop state can calculate, according to the assigned open-loop output value at the present beat, the open-loop output value at the next beat, to achieve the loop compensation effect as the loop in the closed-loop state. In this way, the takeover delay of the voltage loop and the current loop of a battery power supply during switching can be reduced, and overshoot of the voltage loop and the current loop during switching can be avoided.

Further, in embodiments of the present disclosure, integral saturation may occur in the loop in the open-loop state, the sampled voltage value is compared with the corresponding reference voltage value within the sampling period, or the sampled current value is compared with the corresponding reference current value within the sampling period. In this way, the voltage loop can be determined to be in the open-loop state when sampled voltage values are all less than the reference voltage value within the preset time of the sampling period, or the current loop is determined to be in the open-loop state when sampled current values are all less than the reference current value within the preset time of the sampling period.

Further, in embodiments of the present disclosure, the time value may be selected from t≥1/fg as the critical time value, and the interval range from time 0 to the critical time value is taken as the sampling period. In this way, normal loop compensation calculation of the loop in the closed-loop control circuit can be ensured, and the closed-loop control circuit can operate steadily. The data of sampled voltage output values or sampled current output values is more reliable, and the voltage loop can be precisely determined to be in the open-loop state when sampled voltage values are all less than the reference voltage value within the preset time of the sampling period, or the current loop can be precisely determined to be in the open-loop state when sampled current values are all less than the reference current value within the preset time of the sampling period.

Further, when the wave-generation control value is assigned to the open-loop output value at the present beat, the wave-generation control value can be assigned in representations of the voltage value or current value according to the actual situation that the loop is the voltage loop or current loop. In this way, the wave-generation control value can be adjusted and converted in advance, so that the assigned open-loop output value at the present beat can maintain the same representation as the original open-loop output value, and the loop compensation calculation of the loop in the open-loop state can be completed quickly.

Further, the wave-generation control value is assigned to the open-loop output value at the present beat, the sampled open-loop value is also affected, and correspondingly, the difference value obtained based on the sampled open-loop value is updated with the beat. In this way, when the loop compensation calculation is performed on the loop in the open-loop state by using the wave-generation control value, the accuracy of parameters in the loop compensation calculation can be ensured.

Further, the loop compensation calculation can be effectively performed by using the PI loop compensator, so that the open-loop output value is closer to the reference open-loop value after the loop compensation calculation is completed.

A computer-readable storage medium is further provided in embodiments of the present disclosure. The computer-readable storage medium stores a computer-readable instruction, and the computer-readable instruction, when executed by a processor, is operable with the processor to further perform operations of the method for suppressing overshoot of an output voltage or output current as described in embodiments.

It will be evident to those skilled in the art that, for the sake of convenience and simplicity, division of above functional units and modules is just illustrative. In actual application, the above functions may be allocated to and implemented by different functional units and modules according to actual needs, in other words, an internal structure of an apparatus is divided into different functional units or modules, so as to implement all or part of functions described in the foregoing.

The above embodiments are merely intended to describe technical solutions of the present disclosure rather than limit the scope of protection of the disclosure. Although the present disclosure is described in detail with reference to foregoing embodiments, those skilled in the art should understand that they may still make modifications to technical solutions described in the foregoing embodiments or make equivalent replacements to some technical features thereof. Any modification or replacement, which do not make the essence of corresponding technical solutions depart from the spirit and scope of technical solutions of embodiments of the present disclosure, shall be included in the scope of protection of the disclosure.

What is claimed is:

1. A method of suppressing overshoot of an output voltage or output current, comprising:
    determining a sampling period according to a loop bandwidth;
    obtaining a sampled voltage value or a sampled current value of each loop in a closed-loop control circuit within the sampling period, wherein said each loop comprises a voltage loop and a current loop, the sampled voltage value is obtained when a loop is the voltage loop, and the sampled current value is obtained when the loop is the current loop;
    determining that the voltage loop is in an open-loop state when sampled voltage values are all less than a reference voltage value within a preset time of the sampling period, or determining that the current loop is in the open-loop state when sampled current values are all less than a reference current value within the preset time of the sampling period;
    obtaining a wave-generation control value output by the closed-loop control circuit at a present beat;
    assigning the wave-generation control value output at the present beat to an open-loop output value at the present beat, wherein the open-loop output value is an output value of the loop in the open-loop state; and
    calculating, by using an assigned open-loop output value at the present beat, an open-loop output value of the loop in the open-loop state at a next beat.

2. The method of claim 1, wherein determining the sampling period according to the loop bandwidth comprises:
    selecting a time value from t≥1/fg as a critical time value, wherein fg is the loop bandwidth; and
    determining the sampling period according to the critical time value.

3. The method of claim 1, wherein the wave-generation control value is indicated by a voltage value or a current value, and assigning the wave-generation control value output at the present beat to the open-loop output value at the present beat comprises:

assigning the wave-generation control value output at the present beat and indicated by the voltage value to the open-loop output value at the present beat when the loop in the open-loop state is the voltage loop; and assigning the wave-generation control value output at the present beat and indicated by the current value to the open-loop output value at the present beat when the loop in the open-loop state is the current loop.

4. The method of claim 1, wherein the open-loop output value is obtained based on a difference value, and the difference value is an absolute difference value between a sampled open-loop value and a reference open-loop value.

5. The method of claim 4, wherein the open-loop output value is calculated by a proportional-integral (PI) loop compensator for loop compensation and obtained from an original open-loop output value limited in amplitude, and the original open-loop output value satisfies:
Piout=Piout1+k3*Err−k4*Err1, wherein Piout1 is an open-loop output value at a previous beat, k3 is a first loop-calculation-coefficient, k4 is a second loop-calculation-coefficient, Err is the difference value, and Err1 is a difference value at the previous beat.

6. The method of claim 1, wherein the closed-loop control circuit comprises a double-loop competitive loop and a nested loop.

7. A charging device, comprising a memory, a processor, and a computer-readable instruction stored in the memory and executable on the processor, wherein the computer-readable instruction, when executed by the processor, is operable with the processor to perform:

determining a sampling period according to a loop bandwidth;

obtaining a sampled voltage value or a sampled current value of each loop in a closed-loop control circuit within the sampling period, wherein said each loop comprises a voltage loop and a current loop, the sampled voltage value is obtained when a loop is the voltage loop, and the sampled current value is obtained when the loop is the current loop;

determining that the voltage loop is in an open-loop state when sampled voltage values are all less than a reference voltage value within a preset time of the sampling period, or determining that the current loop is in the open-loop state when sampled current values are all less than a reference current value within the preset time of the sampling period;

obtaining a wave-generation control value output by the closed-loop control circuit at a present beat;

assigning the wave-generation control value output at the present beat to an open-loop output value at the present beat, wherein the open-loop output value is an output value of the loop in the open-loop state; and calculating, by using an assigned open-loop output value at the present beat, an open-loop output value of the loop in the open-loop state at a next beat.

8. The charging device of claim 7, wherein in terms of determining the sampling period according to the loop bandwidth, the computer-readable instruction, when executed by the processor, is operable with the processor to perform:

selecting a time value from t≥1/fg as a critical time value, wherein fg is the loop bandwidth; and determining the sampling period according to the critical time value.

9. The charging device of claim 7, wherein the wave-generation control value is indicated by a voltage value or a current value, and in terms of assigning the wave-generation control value output at the present beat to the open-loop output value at the present beat, the computer-readable instruction, when executed by the processor, is operable with the processor to perform:

assigning the wave-generation control value output at the present beat and indicated by the voltage value to the open-loop output value at the present beat when the loop in the open-loop state is the voltage loop; and assigning the wave-generation control value output at the present beat and indicated by the current value to the open-loop output value at the present beat when the loop in the open-loop state is the current loop.

10. The charging device of claim 7, wherein the open-loop output value is obtained based on a difference value, and the difference value is an absolute difference value between a sampled open-loop value and a reference open-loop value.

11. The charging device of claim 10, wherein the open-loop output value is calculated by a proportional-integral (PI) loop compensator for loop compensation and obtained from an original open-loop output value limited in amplitude, and the original open-loop output value satisfies:
Piout=Piout1+k3*Err−k4*Err1, wherein Piout1 is an open-loop output value at a previous beat, k3 is a first loop-calculation-coefficient, k4 is a second loop-calculation-coefficient, Err is the difference value, and Err1 is a difference value at the previous beat.

12. The charging device of claim 7, wherein the closed-loop control circuit comprises a double-loop competitive loop and a nested loop.

13. A non-transitory computer-readable storage medium, the non-transitory computer-readable storage medium storing a computer-readable instruction, wherein the computer-readable instruction, when executed by a processor, is operable with the processor to perform:

determining a sampling period according to a loop bandwidth;

obtaining a sampled voltage value or a sampled current value of each loop in a closed-loop control circuit within the sampling period, wherein said each loop comprises a voltage loop and a current loop, the sampled voltage value is obtained when a loop is the voltage loop, and the sampled current value is obtained when the loop is the current loop;

determining that the voltage loop is in an open-loop state when sampled voltage values are all less than a reference voltage value within a preset time of the sampling period, or determining that the current loop is in the open-loop state when sampled current values are all less than a reference current value within the preset time of the sampling period;

obtaining a wave-generation control value output by the closed-loop control circuit at a present beat;

assigning the wave-generation control value output at the present beat to an open-loop output value at the present beat, wherein the open-loop output value is an output value of the loop in the open-loop state; and calculating, by using an assigned open-loop output value at the present beat, an open-loop output value of the loop in the open-loop state at a next beat.

14. The non-transitory computer-readable storage medium of claim 13, wherein in terms of determining the sampling period according to the loop bandwidth, the computer-readable instruction, when executed by a processor, is operable with the processor to perform:

selecting a time value from t≥1/fg as a critical time value, wherein fg is the loop bandwidth; and determining the sampling period according to the critical time value.

15. The non-transitory computer-readable storage medium of claim 13, wherein the wave-generation control value is indicated by a voltage value or a current value, and in terms of assigning the wave-generation control value output at the present beat to the open-loop output value at the present beat, the computer-readable instruction, when executed by a processor, is operable with the processor to perform:

assigning the wave-generation control value output at the present beat and indicated by the voltage value to the open-loop output value at the present beat when the loop in the open-loop state is the voltage loop; and assigning the wave-generation control value output at the present beat and indicated by the current value to the open-loop output value at the present beat when the loop in the open-loop state is the current loop.

16. The non-transitory computer-readable storage medium of claim 13, wherein the open-loop output value is obtained based on a difference value, and the difference value is an absolute difference value between a sampled open-loop value and a reference open-loop value.

17. The non-transitory computer-readable storage medium of claim 16, wherein the open-loop output value is calculated by a proportional-integral (PI) loop compensator for loop compensation and obtained from an original open-loop output value limited in amplitude, and the original open-loop output value satisfies: Piout=Piout1+k3*Err−k4*Err1, wherein Piout1 is an open-loop output value at a previous beat, k3 is a first loop-calculation-coefficient, k4 is a second loop-calculation-coefficient, Err is the difference value, and Err1 is a difference value at the previous beat.

18. The non-transitory computer-readable storage medium of claim 13, wherein the closed-loop control circuit comprises a double-loop competitive loop and a nested loop.

* * * * *